United States Patent
Kamen et al.

(10) Patent No.: US 12,541,847 B2
(45) Date of Patent: Feb. 3, 2026

(54) DOMAIN ADAPTION FOR PROSTATE CANCER DETECTION

(71) Applicant: Siemens Healthineers AG, Forchheim (DE)

(72) Inventors: Ali Kamen, Skillman, NJ (US); Bin Lou, Princeton Junction, NJ (US)

(73) Assignee: Siemens Healthineers AG, Forchheim (DE)

( * ) Notice: Subject to any disclaimer, the term of this patent is extended or adjusted under 35 U.S.C. 154(b) by 327 days.

(21) Appl. No.: 18/296,400

(22) Filed: Apr. 6, 2023

(65) Prior Publication Data

US 2024/0338813 A1     Oct. 10, 2024

(51) Int. Cl.
*G06T 7/00*     (2017.01)
*G06T 11/00*     (2006.01)

(52) U.S. Cl.
CPC .......... *G06T 7/0012* (2013.01); *G06T 11/003* (2013.01); *G06T 2207/10088* (2013.01); *G06T 2207/20081* (2013.01); *G06T 2207/20084* (2013.01); *G06T 2207/30081* (2013.01)

(58) Field of Classification Search
None
See application file for complete search history.

(56) References Cited

U.S. PATENT DOCUMENTS

2023/0111306 A1*   4/2023   Anand ................ G06T 7/0014
382/128

OTHER PUBLICATIONS

Harnessing Uncertainty in Domain Adaptation for MRI Prostate Lesion Segmentation, Chiou et al, Jan. 18, 2021.*
American Cancer Society, Facts & Figures, 2021, retrieved at https://www.cancer.org, 72 pgs.
Winkel et al., "A novel deep learning based computer-aided diagnosis system improves the accuracy and efficiency of radiologists in reading biparametric magnetic resonance images of the prostate: results of a multireader, multicase study", Investigative Radiology, 2021, pp. 605-613.

(Continued)

*Primary Examiner* — Fan Zhang (57) ABSTRACT

Systems and methods for performing a medical imaging analysis task using a machine learning based model are provided. One or more input medical images acquired using one or more out-of-distribution image acquisition parameters and having out-of-distribution imaging properties are received. The one or more out-of-distribution image acquisition parameters and the out-of-distribution imaging properties are out-of-distribution with respect to training data on which the machine learning based model is trained. One or more synthesized medical images are generated from the one or more input medical images using a machine learning based generator network. The one or more synthesized medical images are generated for one or more in-distribution image acquisition parameters and have in-distribution imaging properties. The one or more in-distribution image acquisition parameters and the in-distribution imaging properties are in-distribution with respect to the training data on which the machine learning based model is trained. The medical imaging analysis task is performed based on the one or more synthesized medical images using the machine learning based model. Results of the medical imaging analysis task are output.

18 Claims, 5 Drawing Sheets

(56) References Cited

OTHER PUBLICATIONS

Winkel et al., "Autonomous detection and classification of PI-RADS lesions in an MRI screening population incorporating multicenter-labeled deep learning and biparametric imaging: proof of concept", Diagnostics, 2020, pp. 1-14.
Yu et al., "False positive reduction using multiscale contextual features for prostate cancer detection in multi-parametric MRI scans", IEEE 17th International Symposium on Biomedical Imaging (ISBI), 2020, pp. 1355-1359.
Yan et al., "MRI manufacturer shift and adaptation: increasing the generalizability of deep learning segmentation for MR images acquired with different scanners", Radiology: Artificial Intelligence, 2020, pp. 1-10.
Jo et al., "Measuring the tendency of CNNs to Learn Surface Statistical Regularities", arXiv:1711.11561v1, 2017, pp. 1-12.
Li et al., "Domain generalization with adversarial feature learning", Proceedings of the IEEE Conference on Computer Vision and Pattern Recognition, 2018, pp. 5400-5409.
Ghifary et al., "Domain generalization for object recognition with multi-task autoencoders", arXiv:1508.07680v1, 2015, pp. 1-12.
Carlucci et al., "Domain generalization by solving jigsaw puzzles", Proceedings of the IEEE/CVF Conference on Computer Vision and Pattern Recognition, 2019, pp. 2229-2238.
Zhang et al., "Task driven generative modeling for unsupervised domain adaptation: Application to x-ray image segmentation", arXiv:1806.07201v1, 2018, pp. 1-9.
Chen et al., "Semantic-aware generative adversarial nets for unsupervised domain adaptation in chest x-ray segmentation", arXiv:1806.00600v2, 2018, 8 pgs.
Zhu et al., "Unpaired image-to-image translation using cycle-consistent adversarial networks", arXiv:1703.10593v6, 2018, 18 pgs.
Extended European Search Report (EESR) mailed Sep. 6, 2024 in corresponding European Patent Application No. 24168740.9.
Jue Jiang et al: "Self-derived organ attention for unpaired CT-MRI deep domain adaptation based MRI segmentation", Physics in Medicine and Biology, Institute of Physics Publishing, Bristol GB, vol. 65, No. 20, Oct. 7, 2020 (Oct. 7, 2020), p. 205001.
Chiou Eleni et al: "Harnessing Uncertainty in Domain Adaptation for MRI Prostate Lesion Segmentation", Medical Image Computing and Computer Assisted Intervention—MICCAI 2020 : 23rd International Conference, Lima, Peru, Oct. 4-8, 2020, Proceedings, Part I, vol. 12261, Sep. 29, 2020 (Sep. 29, 2020) , pp. 510-520, XP093188640, *abstract* * p. 512-p. 517; figures 1, 2 *.
Yao Kai et al: "A Novel 3D Unsupervised Domain Adaptation Framework for Cross-Modality Medical Image Segmentation", IEEE Journal of Biomedical and Health Informatics, vol. 26, No. 10, Oct. 4, 2022 (Oct. 4, 2022), pp. 4976-4986, XP093188248, Piscataway, NJ, USA ISSN: 2168-2194, DOI: 10.1109/BHI.2022.3162118.
Guan Hao et al: "Domain Adaptation for Medical Image Analysis: A Survey", IEEE Transactions On Biomedical Engineering, vol. 69, No. 3, Oct. 4, 2021 (Oct. 4, 2021), pp. 1173-1185, USA ISSN: 0018-9294, DOI: 10.1109/TBME.2021.3117407 * the whole document*.
Yan Wenjun et al:; "The Domain Shift Problem of Medical Image Segmentation and Vendor-Adaptation by Unet-GAN"; 1 Department of Electrical Engineering, Fudan University, Shanghai, China.
Felfeliyan Banafshe et al:; "MRI Knee Domain Translation for Unsupervised Segmentation By CycleGAN (data from Osteoarthritis initiative (OAI))"; 2021 43rd Annual International Conference of the IEEE Engineering in Medicine & Biology Society (EMBC); Oct. 31-Nov. 4; 2021. Virtual Conference.

* cited by examiner

DOMAIN ADAPTION FOR PROSTATE CANCER DETECTION

TECHNICAL FIELD

The present invention relates generally to artificial intelligence/machine learning for medical imaging analysis, and in particular to domain adaption for prostate cancer detection.

BACKGROUND

Prostate cancer is one of the most common types of cancer and is one of the leading causes of death in males. Early detection and intervention of prostate cancer is important for increasing the likelihood of survival. Conventionally, mpMRI (multi-parametric magnetic resonance imaging) imaging is used for prostate cancer detection and assessment. However, manually reading an mpMRI series is a cumbersome and time-consuming task. Recently, AI (artificial intelligence) based systems have been proposed for prostate cancer detection and assessment based on mpMRI imaging.

However, since AI based systems are data dependent, such AI based systems may overconfidently predict results of the prostate cancer detection and assessment from input mpMRI imaging that is outside of the distribution of the training data on which the AI based systems were trained. For example, mpMRI imaging that was acquired with different image acquisition parameters (e.g., b-value settings and machine noise) may result in a significant decrease in performance of AI based systems that were trained with mpMRI imaging acquired with different image acquisition parameters.

BRIEF SUMMARY OF THE INVENTION

In accordance with one or more embodiments, systems and methods for performing a medical imaging analysis task using a machine learning based model are provided. One or more input medical images acquired using one or more out-of-distribution image acquisition parameters and having out-of-distribution imaging properties are received. The one or more out-of-distribution image acquisition parameters and the out-of-distribution imaging properties are out-of-distribution with respect to training data on which the machine learning based model is trained. One or more synthesized medical images are generated from the one or more input medical images using a machine learning based generator network. The one or more synthesized medical images are generated for one or more in-distribution image acquisition parameters and have in-distribution imaging properties. The one or more in-distribution image acquisition parameters and the in-distribution imaging properties are in-distribution with respect to the training data on which the machine learning based model is trained. The medical imaging analysis task is performed based on the one or more synthesized medical images using the machine learning based model. Results of the medical imaging analysis task are output.

In one embodiment, the out-of-distribution image acquisition parameters and the in-distribution image acquisition parameters comprise parameters of an MRI (magnetic resonance imaging) scanner. For example, the parameters of the MRI scanner may comprise b-value settings.

In one embodiment, the one or more synthesized medical images are generated based on metadata of values of the out-of-distribution image acquisition parameters and values of the in-distribution image acquisition parameters.

In one embodiment, the machine learning based generator network is jointly trained with another machine learning based generator network. The other machine learning based generator network generates synthesized out-of-distribution medical images from in-distribution training medical images. In one embodiment, the machine learning based generator network generates reconstructed in-distribution medical images from the synthesized out-of-distribution medical images and the machine learning based generator network is trained based on segmentation predictions from the reconstructed in-distribution medical images generated using the machine learning based model.

In one embodiment, the machine learning based generator network is trained using a discriminator network. The discriminator network distinguishes between 1) synthesized in-distribution images generated by the machine learning based generator network and corresponding segmentation predictions generated from the machine learning based model and 2) real in-distribution images and corresponding segmentation predictions as being real or synthesized.

In one embodiment, the one or more input medical images comprises one or more mpMRI (multi-parametric magnetic resonance imaging) images. In one embodiment, the one or more input medical images depict a prostate of a patient and the medical imaging analysis task is detection of prostate cancer.

These and other advantages of the invention will be apparent to those of ordinary skill in the art by reference to the following detailed description and the accompanying drawings.

DETAILED DESCRIPTION

The present invention generally relates to methods and systems for domain adaptation for prostate cancer detection. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for a domain adaptation framework for a prostate cancer detection model. The domain adaptation framework translates real input mpMRI (multi-parametric magnetic resonance imaging) images, acquired using one or more out-of-distribution image acquisition parameters and therefore having out-of-distribution imaging properties, to synthesized mpMRI images, generated for one or more in-distribution image acquisition parameters and therefore having in-distribution imaging properties. The out-of-distribution image acquisition parameters and the out-of-distribution imaging properties are out-of-distribution with respect to training data on which the prostate cancer detection model is trained, while the in-distribution image acquisition parameters and the in-distribution imaging properties are in distribution with respect to the training data on which the prostate cancer detection model is strained.

Advantageously, embodiments described herein provide for domain adaptation without requiring annotations on the target in-distribution image acquisition parameters and can learn mappings from source data to target data in an unsupervised and unpaired manner. As the domain shift may be highly related to machine settings, vendors, and b-value settings, such machine settings, vendors, and b-value settings may be provided as additional metadata embedded as conditional weights for the domain adaptation framework. Further, to prevent semantic distortion, the prostate cancer detection model is applied without extra training or annotations.

Figure 1:
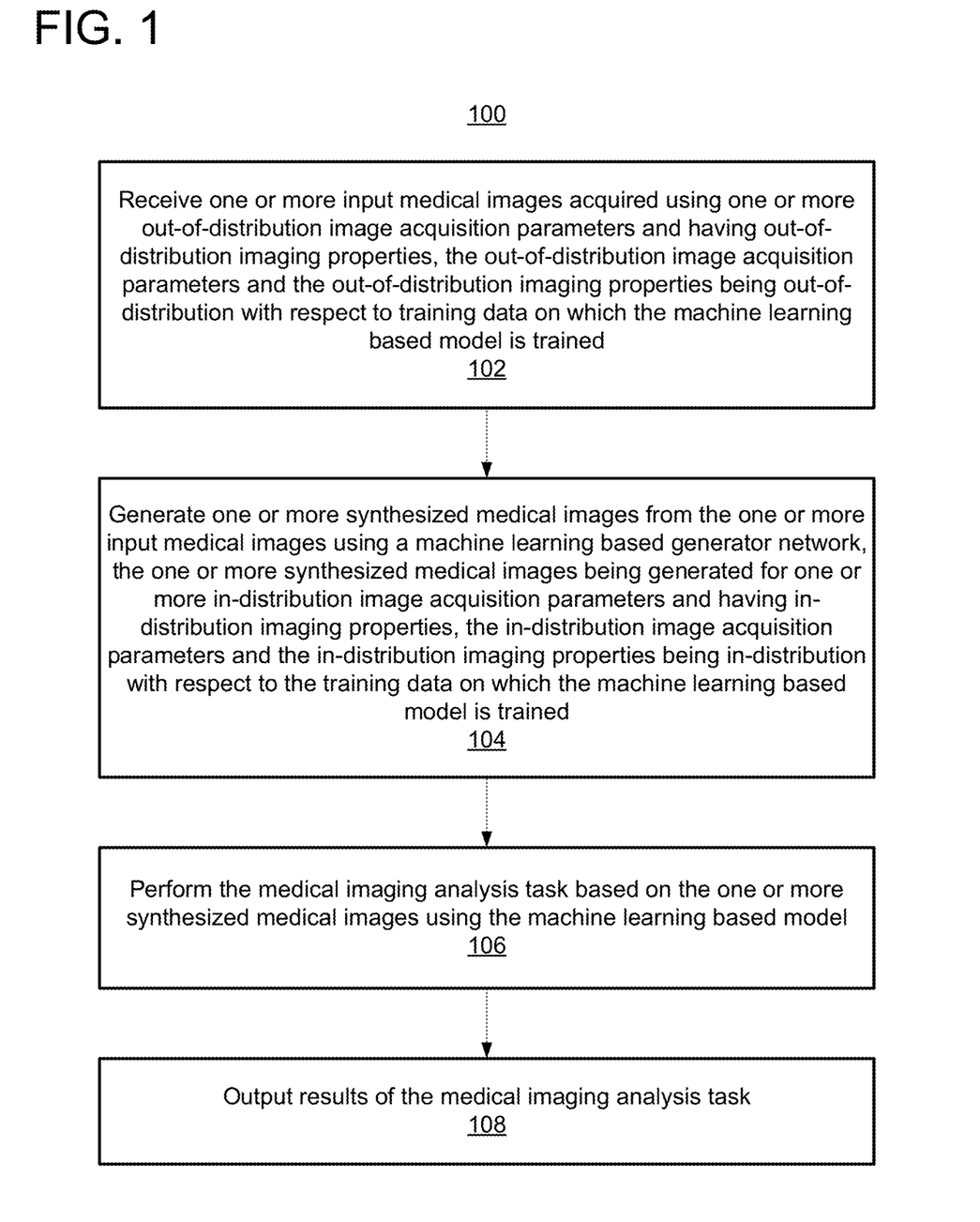
FIG. 1 shows a method for performing a medical imaging analysis task using a machine learning based model, in accordance with one or more embodiments.

FIG. 1 shows a method 100 for performing a medical imaging analysis task using a machine learning based model, in accordance with one or more embodiments. The steps of method 100 may be performed by one or more suitable computing devices, such as, e.g., computer 502 of FIG. 5.

At step 102 of FIG. 1, one or more input medical images acquired using one or more out-of-distribution image acquisition parameters and having out-of-distribution imaging properties are received. The out-of-distribution image acquisition parameters and the out-of-distribution imaging properties are out-of-distribution with respect to training data on which the machine learning based model is trained. Specifically, the out-of-distribution image acquisition parameters are out-of-distribution with respect to image acquisition parameters from which the training data was acquired and the out-of-distribution imaging properties are out-of-distribution with respect to imaging properties of the training data.

The image acquisition parameters of the out-of-distribution image acquisition parameters may comprise any protocol or setting of the image acquisition device from which the input medial images are acquired. For example, in one embodiment, the image acquisition parameters may be protocols or settings of an MRI (magnetic resonance imaging) scanner, such as, e.g., b-value settings of DWI acquisition, field strength of the MRI scanner (e.g., 1.5 Tesla vs. 3 Tesla), with or without fat suppression, etc. As a result of being acquired using the out-of-distribution image acquisition parameters, the input medical images have out-of-distribution imaging properties. In one example, the imaging properties of the out-of-distribution imaging properties comprise intensity values. However, the imaging properties of the out-of-distribution imaging properties may comprise any other imaging property of the input medical images.

In one embodiment, the input medical images depict an anatomical object of a patient. In one example, the anatomical object is a prostate of the patient. The prostate may possibly comprise one or more tumors. However, the anatomical object may be any other suitable organ, vessel, bone, lesion, or anatomical object of interest.

In one embodiment, the input medical images are mpMRI medical images of the patient. For example, the mpMRI medical images may comprise T2 W (T2-weighted) images, DWI (dynamic weighted images) images, ADC (apparent diffusion coefficient) maps, and/or computed high-b DWI images (e.g., b=2000), which may be generated according to the b-value. However, the input medical images may be of any other suitable modality, such as, e.g., other types of MRI (magnetic resonance imaging), CT (computed tomography), US (ultrasound), x-ray, or any other medical imaging modality or combinations of medical imaging modalities. The input medical images may be 2D (two dimensional) images and/or 3D (three dimensional) volumes, which may be represented as a plurality of 2D slices. Thus, reference herein to pixels of a 2D image equally refers to voxels of a 3D volume and vice versa. The input medical images may be received, for example, directly from an image acquisition device (e.g., image acquisition device 514 of FIG. 5), such as, e.g., an MRI scanner, as the input medical images are acquired, may be received by loading previously acquired medical images from a storage or memory of a computer system, or may be received from a remote computer system.

At step 104 of FIG. 1, one or more synthesized medical images are generated from the one or more input medical images using a machine learning based generator network. The one or more synthesized medical images are generated for one or more in-distribution image acquisition parameters and have in-distribution imaging properties. The in-distribution image acquisition parameters and the in-distribution imaging properties are in-distribution with respect to the training data on which the machine learning based model is trained. Specifically, the in-distribution image acquisition parameters are in-distribution with respect to image acquisition parameters from which the training data was acquired and the in-distribution imaging properties are in-distribution with respect to imaging properties of the training data.

The image acquisition parameters of the in-distribution image acquisition parameters may include the same image acquisition parameters (but different values) as the out-of-distribution image acquisition parameters. The imaging properties of the in-distribution imaging properties may include the same imaging properties (but different values) as the out-of-distribution imaging properties.

The generator network receives as input the input medical images and generates as output the synthesized medical images. The generator network is trained during a prior offline or training stage using a training data set. The training data set may comprise real out-of-distribution images and real in-distribution images. In one embodiment, the generator network is trained according to framework 200 of FIG. 2, described in further detail below. Once trained, the trained generator network is applied during an online or inference stage. In one example, trained generator network is applied at step 104 of FIG. 1 for generating the synthesized medical images.

The generator network may be of any suitable machine learning based architecture. In one embodiment, the generator network is of an encoder-decoder architecture. For example, the generator network may be generator G1 202 of FIG. 2, described in further detail below. The encoder network receives as input the input medical images and encodes the input medical images into low-level latent feature representations. The decoder network decodes the latent feature representations to generate the synthesized medical images.

Figure 2:
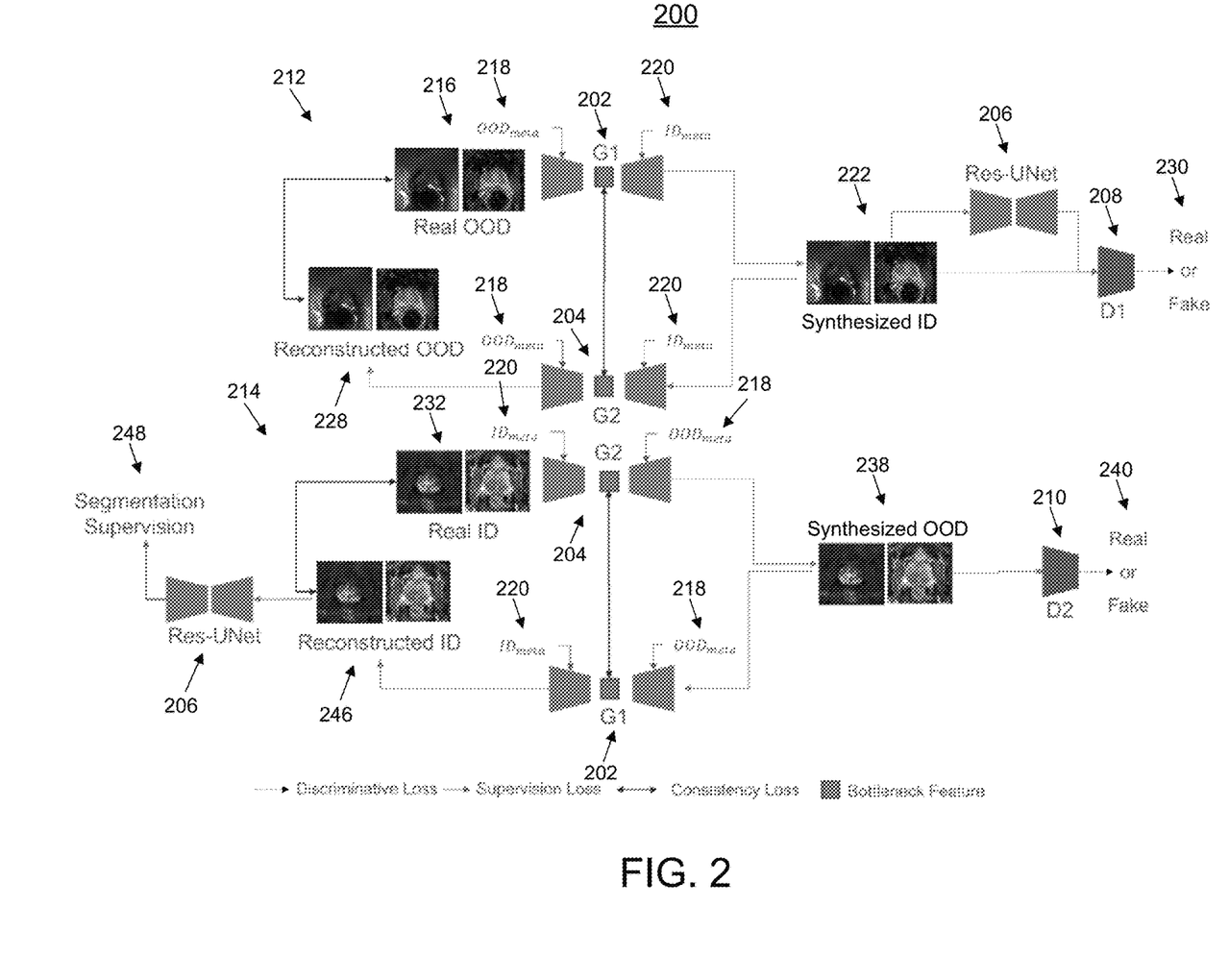
FIG. 2 shows a framework for training one or more machine learning based generator networks for generating synthesized medical images for in-distribution image acquisition parameters and in-distribution imaging properties from input (real) medical images acquired using out-of-distribution image acquisition parameters and having out-of-distribution imaging properties, in accordance with one or more embodiments.

In one embodiment, the generator network is conditioned on metadata of the in-distribution and out-of-distribution image acquisition parameters. In this embodiment, the encoder network conditions the encoding of the input medical images based on embedded features from metadata of values of the out-of-distribution image acquisition parameters and the decoder network conditions the generating of the synthesized medical images based on embedded features from metadata of values of the in-distribution image acquisition parameters. The metadata of the in- and out-of-distribution image acquisition parameters may include values of b-value settings, settings of the image acquisition device (e.g., field strength), vendor of the image acquisition device, type of the image acquisition device, and any other metadata associated with the image acquisition.

At step 106 of FIG. 1, the medical imaging analysis task is performed based on the one or more synthesized medical images using the machine learning based model. The machine learning based model receives as input the synthesized medical images and generates as output results of the medical imaging analysis task. The machine learning based model may be of any suitable machine learning based architecture. In one embodiment, the machine learning based model is a Res-UNet (Deep Residual UNet). For example, the machine learning based model may be Res-UNet 206 of FIG. 2, described in further detail below.

The medical imaging analysis task may comprise any suitable task or tasks performed on the input medical images, such as, e.g., classification, detection, and segmentation. In one example, the medical imaging analysis task is segmentation of the anatomical object (e.g., the prostate) from the input medical images using a machine learning based segmentation network. In another example, the medical imaging analysis task is detection and assessment of prostate cancer from the input medical images using a machine learning based prediction network. In this embodiment, segmentation of the anatomical object is first performed to generate a segmentation mask and the detection and assessment of prostate cancer is performed based on the segmentation mask.

In one embodiment, where the medical imaging analysis task comprises the detection and assessment of prostate cancer, the machine learning based prediction network receives as input one or more mpMRI images (e.g., T2 W images, DWI images, ADC maps) and a segmentation mask of the anatomical object and generates as output predicted semantic lesion candidate regions. The machine learning based prediction network may be implemented, for example, according to an encoder-decoder architecture. The encoder network may comprise five blocks to extract latent feature representations of the input medical images and down samples the feature maps to 2×, 4×, 8×, and 16× respectively. The decoder network comprises five blocks of decoder layers to interpret the semantic features for candidate regions and up samples the feature maps to 2×, 4×, 8×, and 16× respectively to the original image size. All blocks may be represented by residual blocks to prevent vanishing gradient for better semantic segmentation.

At step 108 of FIG. 1, results of the medical imaging analysis task are output. For example, the results of the medical imaging analysis task can be output by displaying the results of the medical imaging analysis task on a display device of a computer system, storing the results of the medical imaging analysis task on a memory or storage of a computer system, or by transmitting the results of the medical imaging analysis task to a remote computer system.

Advantageously, embodiments described herein enable performance of a medical imaging analysis task using a machine learning based model on input medical images that were acquired using out-of-distribution image acquisition parameters and therefore have out-of-distribution imaging properties.

FIG. 2 shows a framework 200 for training one or more machine learning based generator networks for generating synthesized medical images for in-distribution image acquisition parameters and in-distribution imaging properties from input (real) medical images acquired using out-of-distribution image acquisition parameters and having out-of-distribution imaging properties, in accordance with one or more embodiments. Framework 200 is performed during a prior offline or training stage for training the generator networks using a training data set. The training data set comprises real OOD (out-of-distribution) images 216 and real ID (in-distribution) images 232. Once trained, the trained generator networks may be applied during an online or inference stage, such as, e.g., at step 104 of FIG. 1.

Framework 200 comprises generator network G1 202, generator network G2 204, discriminator network D1 208, and discriminator network D2 210 of a GAN (generative adversarial network), as well as Res-UNet 206. Generator network G1 202 translates images from the target domain (real out-of-distribution) to synthesized images in the source domain (synthesized in-domain). Generator network G2 204 translates images from the source domain (real in-domain) to the target domain (synthesized out-of-distribution). Generator networks G1 202 and G2 204 are trained with adversarial loss using discriminator networks D1 208 and D2 210. While generator network G1 202, generator network G2 204, and Res-UNet 206 are each separately represented to facilitate illustration of cycles 212 and 214 in workflow 200, it should be understood that generator network G1 202, generator network G2 204, and Res-UNet 206 are each respectively the same generator network G1 202, generator network G2 204, and Res-UNet 206. Framework 200 comprises four translation procedures.

In a first translation procedure, as shown in cycle 212, generator network G1 202 generates synthesized ID images p 222 from real OOD images x 216. Encoder network of generator network G1 202 receives as input real OOD images x 216 comprising ADC and DWI images and encodes real OOD images x 216 into latent feature representations. The encoding of real OOD images x 216 by the encoder network is conditioned on embedded features from metadata of values of out-of-distribution image acquisition parameters $OOD_{meta}$ 218 for DWI generation. The decoder network of generator network G1 202 decodes the latent feature representations to generate synthesized ID images p 222. The decoding of the latent features by the decoding network is conditioned on embedded features from metadata of values of in-distribution image acquisition parameters $ID_{meta}$ 220. Synthesized ID images p 222 are input to Res-UNet 206, which generates a segmentation prediction U(p) of an anatomical object (e.g., a prostate). Discriminator network D1 208 receives as input 1) a pair of synthesized ID images p 222 and corresponding segmentation prediction U(p) and 2) a pair of randomly sampled real ID images and a corresponding segmentation prediction (not shown in FIG. 2) and attempts to distinguish which pair is real and which is fake (synthesized) 230. The supervision loss function $L_{ROOD\_SID}$ for generating synthesized ID images p 222 from real OOD images x 216 is as follows:

$$L_{ROOD\_SID} := \quad (1)$$
$$E_{p \sim ID}\{\log[D1(p, U(p))]\} + E_{x \sim OOD}\{\log[1 - D1(G1(x), U(G1(x)))]\}$$

In a second translation procedure, as shown in cycle 214, generator network G2 204 generates synthesized OOD images 238 from real ID images 232. Encoder network of generator network G2 204 receives as input real ID images 232 comprising ADC and DWI images and encodes real ID images 232 into latent feature representations. The encoding of real ID images 232 by the encoder network is conditioned on embedded features from metadata of values of in-distribution image acquisition parameters $ID_{meta}$ 220 for DWI generation. The decoder network of generator network G2 204 decodes the latent feature representations to generate synthesized OOD images 238. The decoding of the latent features by the decoding network is conditioned on embedded features from metadata of values of out-of-distribution image acquisition parameters $OOD_{meta}$ 218. Discriminator network D2 210 receives as input synthesized OOD images 238 and randomly sampled real OOD images and attempts to distinguish whether synthesized OOD images 238 are real or fake (synthesized) 240. The supervision loss function $L_{RID\_SOOD}$ for generating synthesized OOD images 238 from real ID images 232 is as follows:

$$L_{RID\_SOOD} := E_{x \sim OOD}\{\log[D2(x)]\} + E_{p \sim ID}\{\log[1 - D2(G2(p))]\} \quad (2)$$

In a third translation procedure, as shown in cycle 212, generator network G1 202 generates synthesized ID images p 222 from real OOD images x 216 and generator network G2 204 generates reconstructed (synthesized) OOD images 228 from synthesized ID images 222. A cycle consistency loss is applied to maintain image level and feature level similarity by calculating the similarity between real OOD images 216 and reconstructed OOD images 228. The cycle consistency loss function $L_{ROOD\_SOOD}$ between real OOD images 216 and reconstructed OOD images 228 is as follows:

$$L_{ROOD\_SOOD} := E_{x \sim OOD}\{\|G1(G2(x)) - x\|_1 + f(f_x, f_p)\} \quad (3)$$

where $f_x$ and $f_p$ are bottleneck features and $f(f_x, f_p)$ is the distance between $f_x$ and $f_p$.

In a fourth translation procedure, as shown in cycle 214, generator network G2 204 generates synthesized OOD images 238 from real ID images 232 and generator network G1 202 generates reconstructed (synthesized) ID images 246 from synthesized OOD images 238. If generator networks G1 202 and G2 204 accurately translate the images, Res-UNet 206 should generate an accurate segmentation prediction. Therefore, a segmentation supervision loss 248 is introduced to calculate the segmentation cross entropies to regulate the semantic information. The cycle consistency loss is also applied to maintain the image level and feature level similarity by calculating the similarity between real ID images 232 and reconstructed ID images 246. The cycle consistency loss function $L_{RID\_SID}$ between real ID images 232 and reconstructed ID images 246 and the segmentation loss $L_{seg}$ are as follows:

$$L_{RID\_SID} := E_{p \sim ID}\{\|G2(G1(p)) - d\|_1 + f(f_x, f_p)\} \quad (4)$$
$$L_{seg} := L_{seg} \quad (5)$$

The objection function for the total loss L for framework 200 is the sum the losses of the Equations (1) through (5) with weights A as follows:

$$L = \lambda_1 L_{ROOD\_SID} + \lambda_2 L_{RID\_SOOD} + \lambda_3 L_{ROOD\_SOOD} + \lambda_4 L_{RID\_SID} + \lambda_5 L_{seg} \quad (6)$$

In an experimental validation, training was performed according to framework 200 using a dataset comprising 2746 in-distribution cases. Training and validation cases were conducted to train both the generator (domain adaptation) network and the machine learning based model for performing the medical imaging analysis task (e.g., segmentation, prostate cancer detection). For testing, 664 (47% of the dataset) in-distribution cases were utilized. Additionally, 768 out-of-distribution cases (53% of the dataset) were collected from different manufactures, with high b-values (larger than 1200), from different protocols, or with artifacts.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based models, as well as with respect to methods and systems for training machine learning based models. Features, advantages or alternative embodiments herein can be assigned to the other claimed objects and vice versa. In other words, claims for methods and systems for training a machine learning based model can be improved with features described or claimed in context of the methods and systems for utilizing a trained machine learning based model, and vice versa.

In particular, the trained machine learning based models applied in embodiments described herein can be adapted by the methods and systems for training the machine learning based models. Furthermore, the input data of the trained machine learning based model can comprise advantageous features and embodiments of the training input data, and vice versa. Furthermore, the output data of the trained machine learning based model can comprise advantageous features and embodiments of the output training data, and vice versa.

In general, a trained machine learning based model mimics cognitive functions that humans associate with other human minds. In particular, by training based on training data, the trained machine learning based model is able to adapt to new circumstances and to detect and extrapolate patterns.

In general, parameters of a machine learning based model can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based model can be adapted iteratively by several steps of training.

In particular, a trained machine learning based model can comprise a neural network, a support vector machine, a decision tree, and/or a Bayesian network, and/or the trained machine learning based model can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 3:
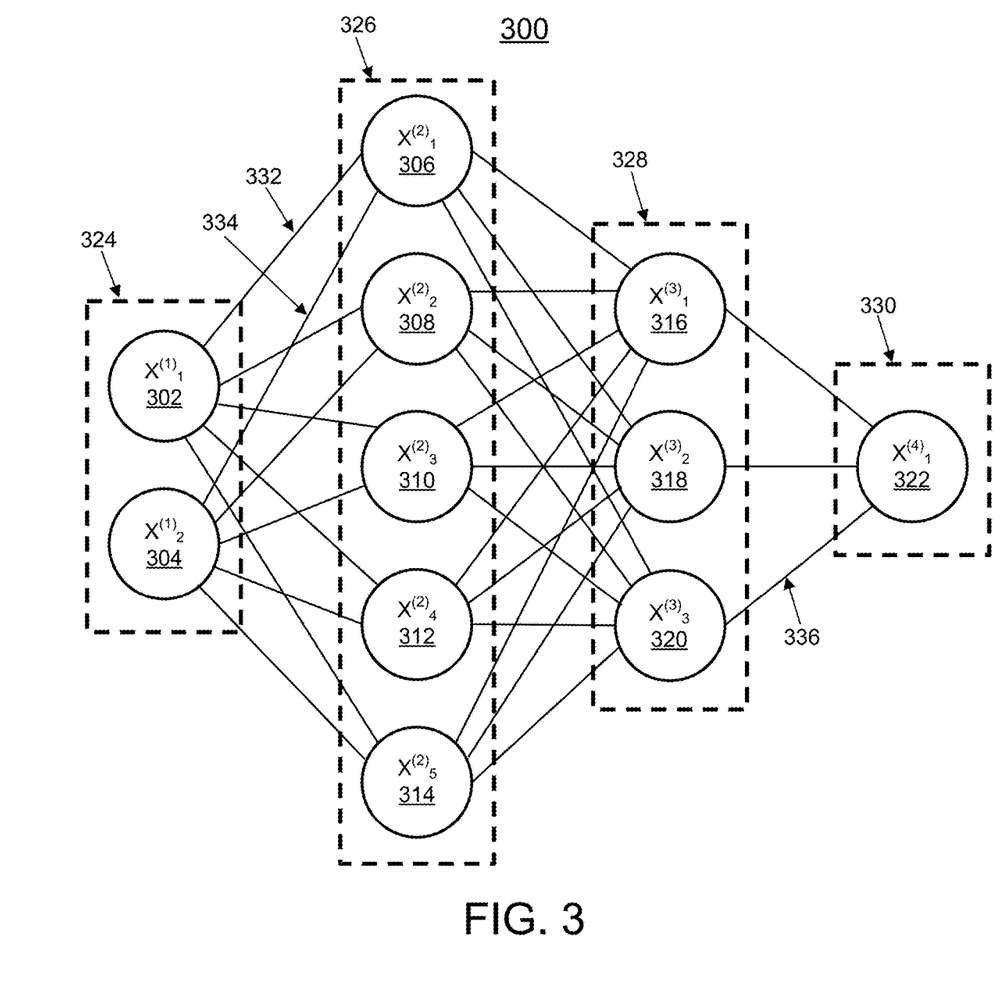
FIG. 3 shows an exemplary artificial neural network that may be used to implement one or more embodiments.

FIG. 3 shows an embodiment of an artificial neural network 300, in accordance with one or more embodiments. Alternative terms for "artificial neural network" are "neural network", "artificial neural net" or "neural net". Machine learning networks described herein, such as, e.g., the machine learning based generator network utilized at step 104 and the machine learning based model utilized at step 106 of FIG. 1 and generator network G1 202, generator network G2 204, discriminator network D1 208, discriminator network D2 210, and Res-UNet 206 of FIG. 2, may be implemented using artificial neural network 300.

The artificial neural network 300 comprises nodes 302-322 and edges 332, 334, . . . , 336, wherein each edge 332, 334, . . . , 336 is a directed connection from a first node 302-322 to a second node 302-322. In general, the first node 302-322 and the second node 302-322 are different nodes 302-322, it is also possible that the first node 302-322 and the second node 302-322 are identical. For example, in FIG. 3, the edge 332 is a directed connection from the node 302 to the node 306, and the edge 334 is a directed connection from the node 304 to the node 306. An edge 332, 334, . . . , 336 from a first node 302-322 to a second node 302-322 is also denoted as "ingoing edge" for the second node 302-322 and as "outgoing edge" for the first node 302-322.

In this embodiment, the nodes 302-322 of the artificial neural network 300 can be arranged in layers 324-330, wherein the layers can comprise an intrinsic order introduced by the edges 332, 334, . . . , 336 between the nodes 302-322. In particular, edges 332, 334, . . . , 336 can exist only between neighboring layers of nodes. In the embodiment shown in FIG. 3, there is an input layer 324 comprising only nodes 302 and 304 without an incoming edge, an output layer 330 comprising only node 322 without outgoing edges, and hidden layers 326, 328 in-between the input layer 324 and the output layer 330. In general, the number of hidden layers 326, 328 can be chosen arbitrarily. The number of nodes 302 and 304 within the input layer 324 usually relates to the number of input values of the neural network 300, and the number of nodes 322 within the output layer 330 usually relates to the number of output values of the neural network 300.

In particular, a (real) number can be assigned as a value to every node 302-322 of the neural network 300. Here, $x^{(n)}_i$ denotes the value of the i-th node 302-322 of the n-th layer 324-330. The values of the nodes 302-322 of the input layer 324 are equivalent to the input values of the neural network 300, the value of the node 322 of the output layer 330 is equivalent to the output value of the neural network 300. Furthermore, each edge 332, 334, . . . , 336 can comprise a weight being a real number, in particular, the weight is a real number within the interval [−1, 1] or within the interval [0, 1]. Here, $w^{(m,n)}_{i,j}$ denotes the weight of the edge between the i-th node 302-322 of the m-th layer 324-330 and the j-th node 302-322 of the n-th layer 324-330. Furthermore, the abbreviation $w^{(n)}_{i,j}$ is defined for the weight $w^{(n,n+1)}_{i,j}$.

In particular, to calculate the output values of the neural network 300, the input values are propagated through the neural network. In particular, the values of the nodes 302-322 of the (n+1)-th layer 324-330 can be calculated based on the values of the nodes 302-322 of the n-th layer 324-330 by $$x_j^{(n+1)} = f\left(\sum_i x_i^{(n)} \cdot w_{i,j}^{(n)}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 324 are given by the input of the neural network 300, wherein values of the first hidden layer 326 can be calculated based on the values of the input layer 324 of the neural network, wherein values of the second hidden layer 328 can be calculated based in the values of the first hidden layer 326, etc.

In order to set the values $w^{(m,n)}_{i,j}$ for the edges, the neural network 300 has to be trained using training data. In particular, training data comprises training input data and training output data (denoted as $t_i$). For a training step, the neural network 300 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 300 (backpropagation algorithm). In particular, the weights are changed according to $$w_{i,j}'^{(n)} = w_{i,j}^{(n)} - \gamma \cdot \delta_j^{(n)} \cdot x_i^{(n)}$$

wherein γ is a learning rate, and the numbers $\delta^{(n)}_j$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta^{(n+1)}_j$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 330, wherein f' is the first derivative of the activation function, and $y^{(n+1)}_j$ is the comparison training value for the j-th node of the output layer 330.

Figure 4:
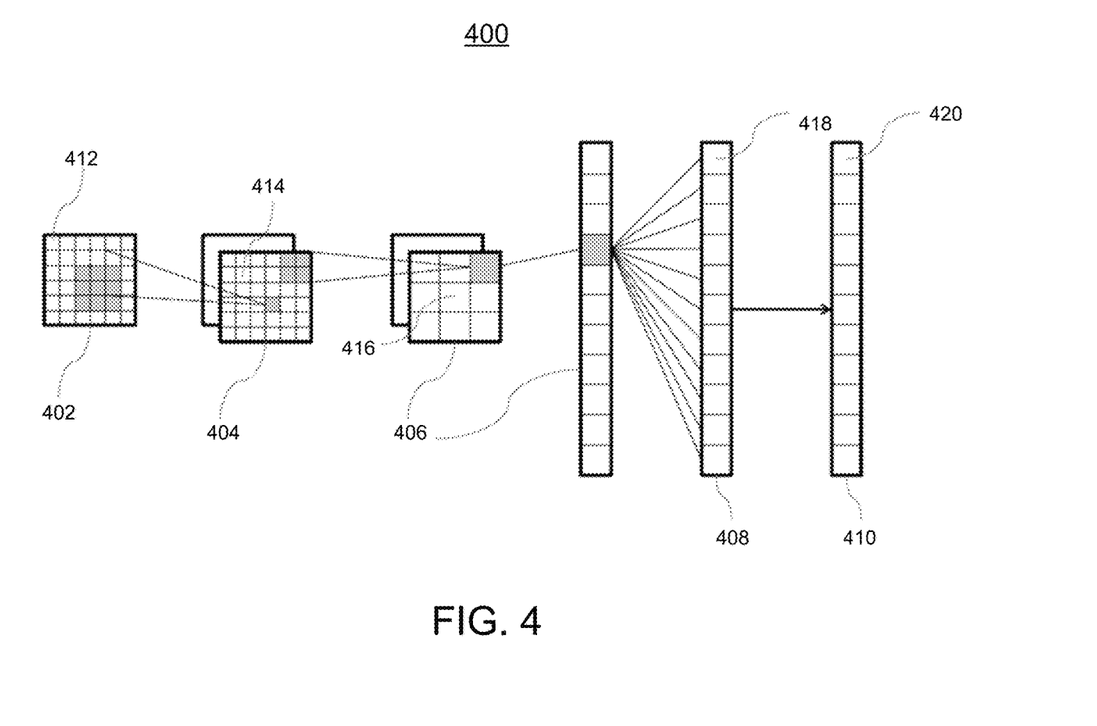
FIG. 4 shows a convolutional neural network that may be used to implement one or more embodiments.

FIG. 4 shows a convolutional neural network 400, in accordance with one or more embodiments. Machine learning networks described herein, such as, e.g., the machine learning based generator network utilized at step 104 and the machine learning based model utilized at step 106 of FIG. 1 and generator network G1 202, generator network G2 204, discriminator network D1 208, discriminator network D2 210, and Res-UNet 206 of FIG. 2, may be implemented using convolutional neural network 400.

In the embodiment shown in FIG. 4, the convolutional neural network comprises 400 an input layer 402, a convolutional layer 404, a pooling layer 406, a fully connected layer 408, and an output layer 410. Alternatively, the convolutional neural network 400 can comprise several convolutional layers 404, several pooling layers 406, and several fully connected layers 408, as well as other types of layers. The order of the layers can be chosen arbitrarily, usually fully connected layers 408 are used as the last layers before the output layer 410.

In particular, within a convolutional neural network 400, the nodes 412-420 of one layer 402-410 can be considered to be arranged as a d-dimensional matrix or as a d-dimensional image. In particular, in the two-dimensional case the value of the node 412-420 indexed with i and j in the n-th layer 402-410 can be denoted as $x^{(n)}_{[i,j]}$. However, the arrangement of the nodes 412-420 of one layer 402-410 does not have an effect on the calculations executed within the convolutional neural network 400 as such, since these are given solely by the structure and the weights of the edges.

In particular, a convolutional layer 404 is characterized by the structure and the weights of the incoming edges forming a convolution operation based on a certain number of kernels. In particular, the structure and the weights of the incoming edges are chosen such that the values $x^{(n)}_k$ of the nodes 414 of the convolutional layer 404 are calculated as a convolution $x^{(n)}_k = K_k * x^{(n-1)}$ based on the values $x^{(n-1)}$ of the nodes 412 of the preceding layer 402, where the convolution * is defined in the two-dimensional case as $$x^{(n)}_k[i, j] = (K_k * x^{(n-1)})[i, j] = \sum_{i'} \sum_{j'} K_k[i', j'] \cdot x^{(n-1)}[i - i', j - j'].$$

Here the k-th kernel $K_k$ is a d-dimensional matrix (in this embodiment a two-dimensional matrix), which is usually small compared to the number of nodes 412-418 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 412-420 in the respective layer 402-410. In particular, for a convolutional layer 404, the number of nodes 414 in the convolutional layer is equivalent to the number of nodes 412 in the preceding layer 402 multiplied with the number of kernels.

If the nodes 412 of the preceding layer 402 are arranged as a d-dimensional matrix, using a plurality of kernels can be interpreted as adding a further dimension (denoted as "depth" dimension), so that the nodes 414 of the convolutional layer 404 are arranged as a (d+1)-dimensional matrix. If the nodes 412 of the preceding layer 402 are already arranged as a (d+1)-dimensional matrix comprising a depth dimension, using a plurality of kernels can be interpreted as expanding along the depth dimension, so that the nodes 414 of the convolutional layer 404 are arranged also as a (d+1)-dimensional matrix, wherein the size of the (d+1)-dimensional matrix with respect to the depth dimension is by a factor of the number of kernels larger than in the preceding layer 402.

The advantage of using convolutional layers 404 is that spatially local correlation of the input data can be exploited by enforcing a local connectivity pattern between nodes of adjacent layers, in particular by each node being connected to only a small region of the nodes of the preceding layer.

In embodiment shown in FIG. 4, the input layer 402 comprises 36 nodes 412, arranged as a two-dimensional 6×6 matrix. The convolutional layer 404 comprises 72 nodes 414, arranged as two two-dimensional 6×6 matrices, each of the two matrices being the result of a convolution of the values of the input layer with a kernel. Equivalently, the nodes 414 of the convolutional layer 404 can be interpreted as arranges as a three-dimensional 6×6×2 matrix, wherein the last dimension is the depth dimension.

A pooling layer 406 can be characterized by the structure and the weights of the incoming edges and the activation function of its nodes 416 forming a pooling operation based on a non-linear pooling function f. For example, in the two dimensional case the values $x^{(n)}$ of the nodes 416 of the pooling layer 406 can be calculated based on the values $x^{(n-1)}$ of the nodes 414 of the preceding layer 404 as $$x^{(n)}[i, j] = f(x^{(n-1)}[id_1, jd_2], \ldots, x^{(n-1)}[id_1 + d_1 - 1, jd_2 + d_2 - 1])$$

In other words, by using a pooling layer 406, the number of nodes 414, 416 can be reduced, by replacing a number d1·d2 of neighboring nodes 414 in the preceding layer 404 with a single node 416 being calculated as a function of the values of said number of neighboring nodes in the pooling layer. In particular, the pooling function f can be the max-function, the average or the L2-Norm. In particular, for a pooling layer 406 the weights of the incoming edges are fixed and are not modified by training.

The advantage of using a pooling layer 406 is that the number of nodes 414, 416 and the number of parameters is reduced. This leads to the amount of computation in the network being reduced and to a control of overfitting.

In the embodiment shown in FIG. 4, the pooling layer 406 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 408 can be characterized by the fact that a majority, in particular, all edges between nodes 416 of the previous layer 406 and the nodes 418 of the fully-connected layer 408 are present, and wherein the weight of each of the edges can be adjusted individually.

In this embodiment, the nodes 416 of the preceding layer 406 of the fully-connected layer 408 are displayed both as two-dimensional matrices, and additionally as non-related nodes (indicated as a line of nodes, wherein the number of nodes was reduced for a better presentability). In this embodiment, the number of nodes 418 in the fully connected layer 408 is equal to the number of nodes 416 in the preceding layer 406. Alternatively, the number of nodes 416, 418 can differ.

Furthermore, in this embodiment, the values of the nodes 420 of the output layer 410 are determined by applying the Softmax function onto the values of the nodes 418 of the preceding layer 408. By applying the Softmax function, the sum the values of all nodes 420 of the output layer 410 is 1, and all values of all nodes 420 of the output layer are real numbers between 0 and 1.

A convolutional neural network 400 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 400 can be trained based on the backpropagation algorithm. For preventing overfitting, methods of regularization can be used, e.g. dropout of nodes 412-420, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps of FIG. 1 or 2, may be performed by a client computer in a network-based cloud computing system. The steps or functions of the methods and workflows described herein, including one or more of the steps of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
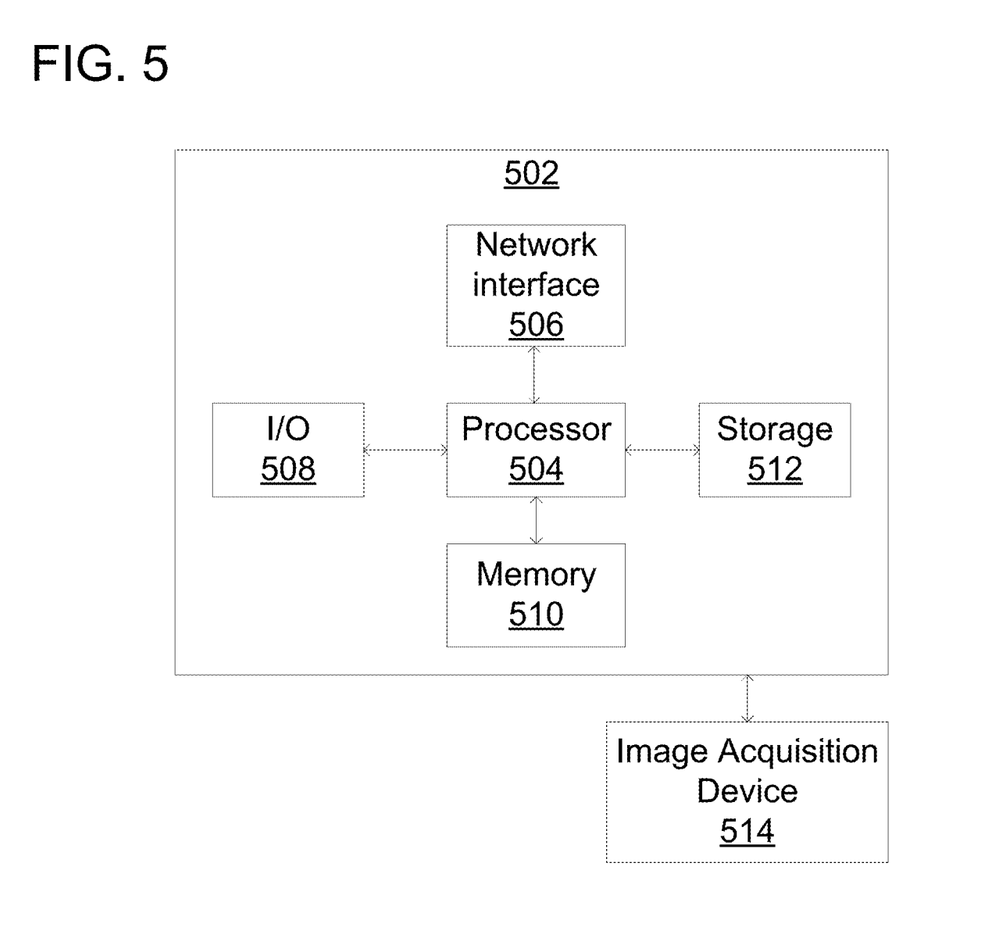
FIG. 5 shows a high-level block diagram of a computer that may be used to implement one or more embodiments.

A high-level block diagram of an example computer 502 that may be used to implement systems, apparatus, and methods described herein is depicted in FIG. 5. Computer 502 includes a processor 504 operatively coupled to a data storage device 512 and a memory 510. Processor 504 controls the overall operation of computer 502 by executing computer program instructions that define such operations. The computer program instructions may be stored in data storage device 512, or other computer readable medium, and loaded into memory 510 when execution of the computer program instructions is desired. Thus, the method and workflow steps or functions of FIG. 1 or 2 can be defined by the computer program instructions stored in memory 510 and/or data storage device 512 and controlled by processor 504 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 504 executes the method and workflow steps or functions of FIG. 1 or 2. Computer 502 may also include one or more network interfaces 506 for communicating with other devices via a network. Computer 502 may also include one or more input/output devices 508 that enable user interaction with computer 502 (e.g., display, keyboard, mouse, speakers, buttons, etc.).

Processor 504 may include both general and special purpose microprocessors, and may be the sole processor or one of multiple processors of computer 502. Processor 504 may include one or more central processing units (CPUs), for example. Processor 504, data storage device 512, and/or memory 510 may include, be supplemented by, or incorporated in, one or more application-specific integrated circuits (ASICs) and/or one or more field programmable gate arrays (FPGAs).

Data storage device 512 and memory 510 each include a tangible non-transitory computer readable storage medium. Data storage device 512, and memory 510, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 508 may include peripherals, such as a printer, scanner, display screen, etc. For example, input/output devices 508 may include a display device such as a cathode ray tube (CRT) or liquid crystal display (LCD) monitor for displaying information to the user, a keyboard, and a pointing device such as a mouse or a trackball by which the user can provide input to computer 502.

An image acquisition device 514 can be connected to the computer 502 to input image data (e.g., medical images) to the computer 502. It is possible to implement the image acquisition device 514 and the computer 502 as one device. It is also possible that the image acquisition device 514 and the computer 502 communicate wirelessly through a network. In a possible embodiment, the computer 502 can be located remotely with respect to the image acquisition device 514.

Any or all of the systems and apparatus discussed herein may be implemented using one or more computers such as computer 502.

One skilled in the art will recognize that an implementation of an actual computer or computer system may have other structures and may contain other components as well, and that FIG. 5 is a high level representation of some of the components of such a computer for illustrative purposes.

Independent of the grammatical term usage, individuals with male, female or other gender identities are included within the term.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method for performing a medical imaging analysis task using a machine learning based model, comprising:
receiving one or more input medical images acquired using one or more out-of-distribution image acquisition parameters and having out-of-distribution imaging properties, the one or more out-of-distribution image acquisition parameters and the out-of-distribution imaging properties being out-of-distribution with respect to training data on which the machine learning based model is trained;
generating one or more synthesized medical images from the one or more input medical images using a machine learning based generator network, the one or more synthesized medical images being generated for one or more in-distribution image acquisition parameters and having in-distribution imaging properties, the one or more in-distribution image acquisition parameters and the in-distribution imaging properties being in-distribution with respect to the training data on which the machine learning based model is trained, the machine learning based generator network comprising 1) an encoder network, conditioned based on values of at least one of the one or more out-of-distribution image acquisition parameters, for encoding the one or more input medical images into feature representations and 2) a decoder network, conditioned based on values of at least one of the one or more in-distribution image acquisition parameters, for decoding the feature representations to generate the one or more synthesized medical images;
performing the medical imaging analysis task based on the one or more synthesized medical images using the machine learning based model; and
outputting results of the medical imaging analysis task.

2. The computer-implemented method of claim 1, wherein the out-of-distribution image acquisition parameters and the in-distribution image acquisition parameters comprise parameters of an MRI (magnetic resonance imaging) scanner.

3. The computer-implemented method of claim 2, wherein the parameters of the MRI scanner comprise b-value settings.

4. The computer-implemented method of claim 1, wherein the machine learning based generator network is jointly trained with another machine learning based generator network, the other machine learning based generator network generating synthesized out-of-distribution medical images from in-distribution training medical images.

5. The computer-implemented method of claim 4, wherein the machine learning based generator network generates reconstructed in-distribution medical images from the synthesized out-of-distribution medical images and wherein the machine learning based generator network is trained based on segmentation predictions from the reconstructed in-distribution medical images generated using the machine learning based model.

6. The computer-implemented method of claim 1, wherein the machine learning based generator network is trained using a discriminator network, the discriminator network distinguishing between 1) synthesized in-distribution images generated by the machine learning based generator network and corresponding segmentation predictions generated from the machine learning based model and 2) real in-distribution images and corresponding segmentation predictions as being real or synthesized.

7. The computer-implemented method of claim 1, wherein the one or more input medical images comprises one or more mpMRI (multi-parametric magnetic resonance imaging) images.

8. The computer-implemented method of claim 1, wherein the one or more input medical images depict a prostate of a patient and the medical imaging analysis task is detection of prostate cancer.

9. An apparatus for performing a medical imaging analysis task using a machine learning based model, comprising:
means for receiving one or more input medical images acquired using one or more out-of-distribution image acquisition parameters and having out-of-distribution imaging properties, the one or more out-of-distribution image acquisition parameters and the out-of-distribution imaging properties being out-of-distribution with respect to training data on which the machine learning based model is trained;

means for generating one or more synthesized medical images from the one or more input medical images using a machine learning based generator network, the one or more synthesized medical images being generated for one or more in-distribution image acquisition parameters and having in-distribution imaging properties, the one or more in-distribution image acquisition parameters and the in-distribution imaging properties being in-distribution with respect to the training data on which the machine learning based model is trained, the machine learning based generator network comprising 1) an encoder network, conditioned based on values of at least one of the one or more out-of-distribution image acquisition parameters, for encoding the one or more input medical images into feature representations and 2) a decoder network, conditioned based on values of at least one of the one or more in-distribution image acquisition parameters, for decoding the feature representations to generate the one or more synthesized medical images;

means for performing the medical imaging analysis task based on the one or more synthesized medical images using the machine learning based model; and means for outputting results of the medical imaging analysis task.

10. The apparatus of claim 9, wherein the out-of-distribution image acquisition parameters and the in-distribution image acquisition parameters comprise parameters of an MRI (magnetic resonance imaging) scanner.

11. The apparatus of claim 10, wherein the parameters of the MRI scanner comprise b-value settings.

12. The apparatus of claim 9, wherein the machine learning based generator network is trained using a discriminator network, the discriminator network distinguishing between 1) synthesized in-distribution images generated by the machine learning based generator network and corresponding segmentation predictions generated from the machine learning based model and 2) real in-distribution images and corresponding segmentation predictions as being real or synthesized.

13. A non-transitory computer readable medium storing computer program instructions for performing a medical imaging analysis task using a machine learning based model, the computer program instructions when executed by a processor cause the processor to perform operations comprising:

receiving one or more input medical images acquired using one or more out-of-distribution image acquisition parameters and having out-of-distribution imaging properties, the one or more out-of-distribution image acquisition parameters and the out-of-distribution imaging properties being out-of-distribution with respect to training data on which the machine learning based model is trained;

generating one or more synthesized medical images from the one or more input medical images using a machine learning based generator network, the one or more synthesized medical images being generated for one or more in-distribution image acquisition parameters and having in-distribution imaging properties, the one or more in-distribution image acquisition parameters and the in-distribution imaging properties being in-distribution with respect to the training data on which the machine learning based model is trained, the machine learning based generator network comprising 1) an encoder network, conditioned based on values of at least one of the one or more out-of-distribution image acquisition parameters, for encoding the one or more input medical images into feature representations and 2) a decoder network, conditioned based on values of at least one of the one or more in-distribution image acquisition parameters, for decoding the feature representations to generate the one or more synthesized medical images;

performing the medical imaging analysis task based on the one or more synthesized medical images using the machine learning based model; and outputting results of the medical imaging analysis task.

14. The non-transitory computer readable medium of claim 13, wherein the out-of-distribution image acquisition parameters and the in-distribution image acquisition parameters comprise parameters of an MRI (magnetic resonance imaging) scanner.

15. The non-transitory computer readable medium of claim 13, wherein the machine learning based generator network is jointly trained with another machine learning based generator network, the other machine learning based generator network generating synthesized out-of-distribution medical images from in-distribution training medical images.

16. The non-transitory computer readable medium of claim 15, wherein the machine learning based generator network generates reconstructed in-distribution medical images from the synthesized out-of-distribution medical images and wherein the machine learning based generator network is trained based on segmentation predictions from the reconstructed in-distribution medical images generated using the machine learning based model.

17. The non-transitory computer readable medium of claim 13, wherein the one or more input medical images comprises one or more mpMRI (multi-parametric magnetic resonance imaging) images.

18. The non-transitory computer readable medium of claim 13, wherein the one or more input medical images depict a prostate of a patient and the medical imaging analysis task is detection of prostate cancer.

* * * * *